Dec. 2, 1924.　　　　　　　　　　　　　　　　　　1,517,743
F. A. MATTESON
EGG GRADER
Filed Dec. 18, 1922
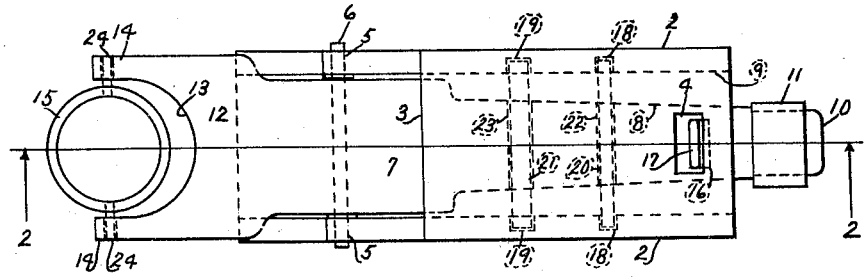
FIGURE 1
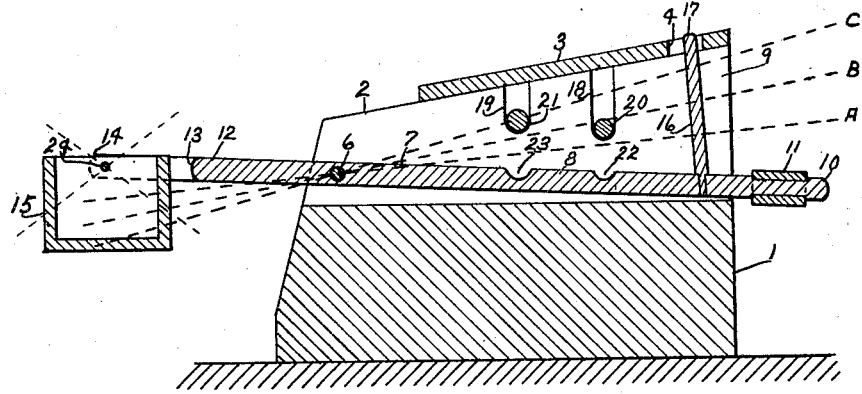
FIGURE 2
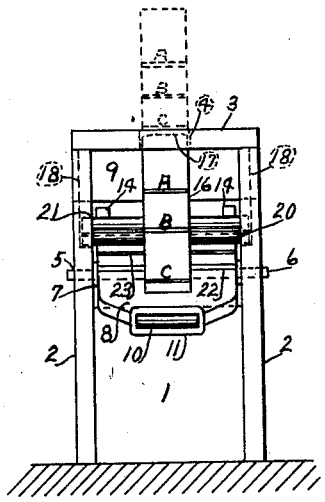
FIGURE 3
INVENTOR
Fred A. Matteson
BY John A. Naismith
ATTORNEY Patented Dec. 2, 1924.

1,517,743

UNITED STATES PATENT OFFICE.

FRED A. MATTESON, OF CAMPBELL, CALIFORNIA.

EGG GRADER.

Application filed December 18, 1922. Serial No. 607,694.

*To all whom it may concern:*

Be it known that I, FRED A. MATTESON, a citizen of the United States, and resident of Campbell, in the county of Santa Clara and State of California, have invented a certain new and useful Improvement in Egg Graders, of which the following is a specification.

My invention relates to a device for sorting egg sizes according to weight.

It is an object of my invention to provide a device of the character indicated in which the center of gravity of the egg being tested always remains in a fixed relationship to the pivotal point of the weighing beam, regardless of the position of the egg in its container.

Another object is to provide a device of the character indicated in which the weights for the various sizes of eggs are automatically placed in their operative position by the action of the weighing beam.

A further object of my invention is to provide a device of the character indicated which is simple in construction, easily manufactured, accurate and positive in its readings and highly efficient in its practical application.

In the drawing:—

Figure 1 is a top plan view of my improved egg sorting device.

Figure 2 is a sectional view taken on line 2—2 of Figure 1.

Figure 3 is an end view showing the scale designating the several sizes of eggs.

Referring more particularly to the drawing, I show at 1 a base member having parallelly arranged upstanding side members 2—2 as shown, a portion of said members having a cover 3 secured thereto and having a rectangular orifice 4 formed near one end thereof as shown.

Pivotally mounted at points as 5—5 is a rod 6 supporting a member 7 which has its longest portion 8 passing through the tunnel 9 formed by the sides 2—2 and top 3. The outer end 10 of portion 8 being weighted as at 11. The opposite end 12 of member 7 is cut away as at 13 leaving a pair of parallelly arranged arms 14—14 between which is pivotally mounted an egg supporting member or basket 15.

The pivotal point 5 of member 7 and the weight 11 on the end 10 thereof are so arranged as to place the egg supporting member 15 in the position shown when empty. At 16 is shown the egg size scale mounted upon member 7 and having its upper end 17 passing through orifice 3 as shown.

At 18—18 and 19—19 are shown slots cut in the side members 2—2 in which rods 20—21 respectively are free to slide when the member 7 comes in contact therewith. The said rods 20—21 resting in grooves 22—23 respectively formed in portion 8 of member 7 as shown. The rod 20 is placed slightly lower than rod 21 and is slightly lighter in weight for purposes hereinafter more fully explained.

My invention as herein disclosed is designed to grade eggs into four different sizes according to weight three of these grades being indicated in Figure 2 by the dotted lines "A", "B" and "C" respectively. These indicating letters are arranged on member 16 so as to appear above the upper edge of top 3 when the proper size of egg is placed in basket 15.

For example, if a small sized egg such as a pullet egg is placed in basket 15 the pivotal member 7 is raised to the position indicated by dotted line "A." In this position the letter "A" on the scale 16 appears above cover 3 and the groove 22 is in contact with rod 20 but does not raise the same in its slot 18—18. If, however, a larger egg is placed in the basket, the same being heavier than the pullet egg will raise the member 7 to position "B" which is indicated by "B" on the scale 16 and the rod 20 has been raised in slots 18—18 while groove 23 is in contact with rod 21. A larger egg will also raise rod 21 and will place member 7 in position "C" which is the extreme position indicated by the device. The smallest sized eggs, known as "pewees" do not operate arm 7 at all when placed in the basket and therefore, in the present case, make the fourth grade.

From the foregoing it may readily be seen that any number of rods as 20 and 21 may be arranged in the device, of varying weights or varying distances from pivotal point 24, or both to indicate the different grades of eggs desired.

By pivoting the egg supporting basket 15 on arms 14—14 of member 7 the center of gravity of the egg and basket will automatically move into the vertical plane passing through the pivot 24 thus allowing an accurate indication of the egg's relative weight, and therefore its size on the scale 16.

Grading by this device is therefore very accurate whereas if the basket 15 were mounted in fixed relation to member 7 the indicator would read different with each different position of the egg. For instance an egg having its large end leaning toward the pivot 5 would grade lighter than the same egg having its large end leaning away from the pivot.

Thus it is seen that I have provided a device which will accurately and quickly sort eggs of a given size by the variation in the weights thereof. The said device being simple of construction, easily manufactured and highly efficient in its readings and in the quickness of its operation. There being no delicately balanced weighing arm to oscillate backwardly and forwardly until brought to rest before the correct size can be determined.

It is to be understood, of course, that while I have herein shown and described the preferred embodiment of my invention that changes in form, proportion, method of construction and operation may be made within the scope of the appended claim.

I claim:—

An egg grader comprising a support, an arm pivotally mounted thereon, egg supporting means pivotally suspended from one end of said arm, balancing means carried by the other end of said arm whereby to maintain the egg support in a raised position with an egg under a predetermined size therein, and an indicator rendered operative by the movement of said arm when an egg in the egg support overbalances said balancing means.

FRED A. MATTESON.